US012135507B2

(12) United States Patent
Egawa et al.

(10) Patent No.: US 12,135,507 B2
(45) Date of Patent: Nov. 5, 2024

(54) ELECTROPHOTOGRAPHIC MEMBER AND ELECTROPHOTOGRAPHIC IMAGE FORMING APPARATUS

(71) Applicant: CANON KABUSHIKI KAISHA, Tokyo (JP)

(72) Inventors: Noriaki Egawa, Tokyo (JP); Tomoaki Nakai, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 413 days.

(21) Appl. No.: 17/481,640

(22) Filed: Sep. 22, 2021

(65) Prior Publication Data

US 2022/0107578 A1 Apr. 7, 2022

(30) Foreign Application Priority Data

Oct. 6, 2020 (JP) ................................ 2020-169229

(51) Int. Cl.
*G03G 15/02* (2006.01)
*G03G 9/087* (2006.01)
*G03G 9/097* (2006.01)

(52) U.S. Cl.
CPC ..... *G03G 15/0233* (2013.01); *G03G 9/08711* (2013.01); *G03G 9/097* (2013.01)

(58) Field of Classification Search
CPC .................................................. G03G 15/0233
See application file for complete search history.

(56) References Cited

U.S. PATENT DOCUMENTS 8,445,071 B2 5/2013 Egawa
8,512,811 B2 8/2013 Egawa
10,551,771 B2 2/2020 Uchida et al.
2016/0349671 A1* 12/2016 Egawa ................ G03G 15/162
2021/0003943 A1 1/2021 Egawa

FOREIGN PATENT DOCUMENTS

JP 2003241464 A * 8/2003
JP 2007-316371 A 12/2007
JP 2016133791 A * 7/2016
JP 2018-106036 A 7/2018
JP 2018106046 A * 7/2018

OTHER PUBLICATIONS

English machine translation of the description of JP-2018106046-A (Year: 2018).*
English machine translation of the description of JP-2016133791-A (Year: 2016).*
English machine translation of the description of JP-2003241464-A (Year: 2003).*

* cited by examiner

*Primary Examiner* — Peter L Vajda
*Assistant Examiner* — Boone Alexander Evans
(74) *Attorney, Agent, or Firm* — VENABLE LLP

(57) ABSTRACT

Provided is an electrophotographic member that includes a surface with excellent abrasion resistance and allows toner to have an increased charge amount, thereby eliciting uniform and high transfer efficiency. This electrophotographic member is provided with a surface layer including at least one of an acrylic resin and methacrylic resin, the surface layer further including a positively chargeable charge control agent, wherein a surface of the surface layer is free from a convex portion having a height of more than 15 μm resulting from the charge control agent.

7 Claims, 3 Drawing Sheets

ELECTROPHOTOGRAPHIC MEMBER AND ELECTROPHOTOGRAPHIC IMAGE FORMING APPARATUS

FIELD

The present disclosure relates to an electrophotographic member that can be used as an intermediate transfer belt in an electrophotographic image forming apparatus such as a copying machine or a printer. The present disclosure also relates to an electrophotographic image forming apparatus.

BACKGROUND

Abrasion resistance has been attempted to be improved in an electrophotographic member, such as an intermediate transfer member, that carries toner on a surface thereof. For this purpose, Japanese Patent Application Laid-Open No. 2007-316371 discloses inclusion of an acrylic resin in a surface layer constituting a toner-carrying surface.

Meanwhile, an electrophotographic member has recently been sought which can exert higher transfer efficiency to output a higher-quality image in an electrophotographic image forming apparatus. One of factors that affect the transfer efficiency is the charge amount of toner. Specifically, it is critical not to decrease the charge amount of toner transferred onto an electrophotographic member in view of keeping high transfer efficiency.

Japanese Patent Application Laid-Open No. 2016-133791 discloses a seamless belt in which a surface layer containing a nigrosine dye as an electroconductive agent is formed to suppress resistance unevenness of the seamless belt due to uneven distribution of the electroconductive agent. In Japanese Patent Application Laid-Open No. 2016-133791, the surface layer is mainly formed of a silicone-based material.

Japanese Patent Application Laid-Open No. 2018-106036 discloses a transfer belt for an image forming apparatus, including a surface layer containing an ionizing radiation curable acrylic compound and an oil-soluble dye. The surface layer may be thinned to prevent cracking. In this case, when light from an optical sensor is reflected on a surface of the transfer belt, the reflected light does not interfere therewith. Accordingly, a variation in the intensity of the reflected light is considered to be small in this transfer belt.

Meanwhile, the present inventors have investigated that a charge control agent capable of supplying a negative charge to negatively chargeable toner is added to a surface layer of an electrophotographic belt. Here, paragraph [0007] of Japanese Patent Application Laid-Open No. 2018-106036 describes a phenomenon that a nigrosine dye as an electroconductive agent hardly aggregates in a surface layer. The present inventors have already found that a nigrosine dye functions as a charge control agent capable of supplying a negative charge to negatively chargeable toner. Then, the present inventors have attempted to include a nigrosine dye in an acrylic resin-containing surface layer of an electrophotographic member. This has resulted in some cases where the nigrosine dye cannot be sufficiently dispersed in a coating material for forming the acrylic resin-containing surface layer, so that convex portions caused by nigrosine dye aggregates are formed on the toner carrying surface (outer surface) of the surface layer formed by such a coating material. Such convex portions may cause a decrease in transfer efficiency.

SUMMARY

At least one aspect of the present disclosure is directed to providing an electrophotographic member having both high durability and excellent transfer efficiency. Another aspect of the present disclosure is directed to providing an electrophotographic image forming apparatus capable of stably forming a high-quality electrophotographic image.

According to one aspect of the present disclosure, there is provided an electrophotographic member including: a base layer; and a surface layer including at least one of an acrylic resin and methacrylic resin on the base layer, the surface layer further including a positively chargeable charge control agent, wherein a surface of the surface layer is free from convex portion having a height of more than 15 μm resulting from the charge control agent. According to another aspect of the present disclosure, there is provided an electrophotographic image forming apparatus including the aforementioned electrophotographic member.

Further features of the present disclosure will become apparent from the following description of exemplary embodiments with reference to the attached drawings.

DESCRIPTION OF THE EMBODIMENTS

The present inventors have paid attention to a phenomenon in which the toner charge amount changes due to contact charging (or triboelectric charging) caused by a difference in charging characteristics between an intermediate transfer member and toner which are brought into contact. The charging characteristic of the intermediate transfer member may be made a more positively chargeable characteristic, that is, may be shifted to a positive side in triboelectric series. In this case, when negatively chargeable toner is held by the intermediate transfer member, the amount of negative charge on the toner is found to increase. Then, it has been studied that a positively chargeable charge control agent is contained in the surface layer of the intermediate transfer member to increase the charge amount of negatively chargeable toner on the surface layer. The results have demonstrated that the charge amount of negatively chargeable toner can be increased. However, a convex portion(s) (hereinafter, also referred to as "convex defect(s)") having a height of more than 15 μm resulting from the charge control agent has occurred on a surface of the surface layer. Here, a convex defect(s) may be present on a toner-carrying surface (hereinafter, sometimes referred to as an "outer surface") of the intermediate transfer member. In this case, poor transfer at a site of the convex defect occurs during a step of primary transfer of a toner image from a photoreceptor and/or during a step of secondary transfer of the toner image from the intermediate transfer member to paper or the like. This may cause dotted white spots on an electrophotographic image.

Such a convex defect is considered to be caused by occurrence of aggregates due to poor compatibility between an acrylic resin monomer and the charge control agent. Thus, further studies have been conducted. In order to make compatible the resin monomer and the positively chargeable charge control agent, a compatibilizer has been added further. This has resulted in an electrophotographic member without the convex defect having a height of more than 15 μm resulting from the charge control agent on the surface. In particular, in the case of using nigrosine as the charge control agent, alkylbenzenesulfonic acid or a salt thereof may be combined as the compatibilizer. This can exert a synergistic effect to provide an electrophotographic member having both excellent charging characteristics and high surface performance.

An electrophotographic member according to an embodiment of the present disclosure will be described in detail with reference to the drawings.

Figure 1:
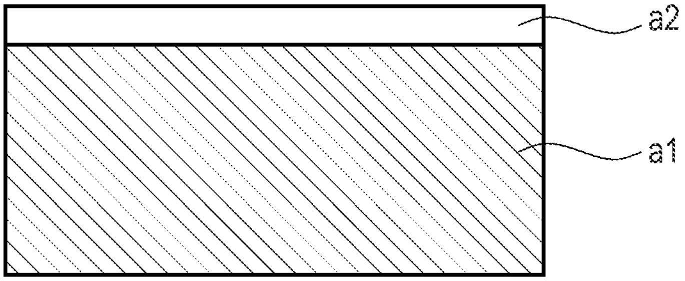
FIG. 1 is a schematic cross-sectional view of an electrophotographic member according to an embodiment of the present disclosure.

FIG. 1 is a schematic cross-sectional view illustrating a layer structure of an endless belt-shaped intermediate transfer member (hereinafter, also referred to as an "intermediate transfer belt") as an electrophotographic member according to an embodiment of the present disclosure. The intermediate transfer member has a base layer a1 and a surface layer a2 containing at least one of an acrylic resin and methacrylic resin on the base layer.

<<Coating Material for Forming Surface Layer>>

The surface layer may be formed, for example, by forming and curing, on a surface of the base layer a1, a coating film made of a coating material for forming the surface layer.

<Constituent Components of Coating Material for Forming Surface Layer>

The surface layer-forming coating material for forming a surface layer contains: at least one of a monomer or an oligomer of at least one of an acrylic resin and methacrylic resin (hereinafter, simply referred to as a resin); and a positively chargeable charge control agent. In addition, it is possible to optionally include an electroconductive agent, a solvent, a radical polymerization initiator, and/or other component(s) as long as the characteristics required for the surface layer in the present disclosure are satisfied. Each constituent component will be described below.

Monomer/Oligomer:

It is possible to preferably use, as the resin monomer, a polyfunctional (meth)acrylic monomer capable of imparting excellent rubbing resistance and abrasion resistance to a surface of the surface layer. Note that the (meth)acrylic monomer means an acrylic monomer or a methacrylic monomer. Specific examples of the polyfunctional (meth) acrylic monomer include pentaerythritol tri(meth)acrylate, pentaerythritol tetra(meth)acrylate, trimethylolpropane tri (meth)acrylate, EO-modified trimethylolpropane tri(meth) acrylate, PO-modified trimethylolpropane tri(meth)acrylate, dipentaerythritol penta(meth)acrylate, dipentaerythritol hexa(meth)acrylate, isocyanuric acid EO-modified di(meth) acrylate, or isocyanuric acid EO-modified tri(meth)acrylate. Among them, dipentaerythritol penta(meth)acrylate or dipentaerythritol hexa(meth)acrylate is a preferable monomer because better abrasion resistance can be imparted to the surface layer.

At least two monomers selected from the above-mentioned monomer group may be used in combination.

Further, it is possible to use, as the resin oligomer, an oligomer produced by polymerizing the above-mentioned monomer(s) and having a mass-average molecular weight of from about 500 to 40000.

Positively Chargeable Charge Control Agent:

Nigrosine is exemplified as a positively chargeable charge control agent that imparts, to the surface layer, a characteristic of increasing the charge amount of negatively chargeable toner and excels in compatibility with the above-mentioned monomer or oligomer. The addition amount based on 100 parts by mass of the resin is preferably 0.1 parts by mass or larger and more preferably 0.5 parts by mass or larger. If the amount is small, the effects are not necessarily obtained sufficiently. If the amount is more than 30 parts by mass based on 100 parts by mass of the resin, the characteristics of the resin are impaired and the strength as a surface layer (resin film) may be decreased.

Compatibilizer:

Examples of an additive (referred to as a compatibilizer) for enhancing compatibility between nigrosine, which is added as a positively chargeable charge control agent, and a monomer or oligomer include alkylbenzenesulfonic acid or a salt thereof. In order to make an aromatic group- and amine-containing nigrosine compatible with an aliphatic moiety-rich acrylic resin, a structure having an aliphatic moiety and an aromatic group and having a sulfonic acid group should be suitable for compatibilization. A $C_{10-14}$ alkyl group of the alkylbenzenesulfonic acid is preferable. The cation part of the salt is preferably a sodium ion or a potassium ion.

Specific examples of the salt of alkylbenzenesulfonic acid include straight-chain sodium alkylbenzenesulfonate having a structure represented by formula (1).

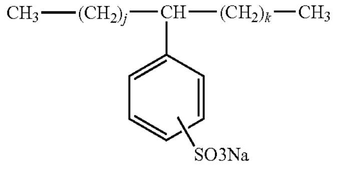

(1)

wherein j and k each independently represent an integer of 1 or more, and j+k is or more and 11 or less. More specific examples include sodium decylbenzenesulfonate (C=10), sodium undecylbenzenesulfonate (C=11), sodium dodecylbenzenesulfonate (C=12), sodium tridecylbenzenesulfonate (C=13), or sodium tetradecylbenzenesulfonate (C=14).

If the amount of nigrosine is large, the amount of alkylbenzenesulfonic acid to be added is also large in accordance with the amount of nigrosine added. The ratio between nigrosine and alkylbenzenesulfonic acid can be adjusted, if appropriate, depending on the type(s) of the resin and/or an additional additive(s). Here, the mass of nigrosine is set to A and the mass of alkylbenzenesulfonic acid or a salt thereof is set to B. In this case, if the mass ratio A:B is approximately 70:30 to 99:1, a small-sized convex defect can be sufficiently decreased. If the ratio of alkylbenzenesulfonic acid is less than nigrosine:alkylbenzenesulfonic acid=99:1, the effect of compatibilization is not be necessarily elicited sufficiently. In addition, the amount of the compatibilizer added to the resin may be too large. In this case, the characteristics of the resin may be impaired and the strength as a resin film may be decreased. Thus, the amount based on 100 parts by mass of the resin is preferably 30 parts by mass or less.

Electroconductive Agent:

Examples of the electroconductive agent that may be contained in the surface layer include, but are not particularly limited to, metal oxide-based, carbon-based, or electroconductive polymer-based electroconductive particles. Note that the electroconductive particles mean an electroconductive material that is immiscible with the resin as a matrix and forms an electroconductive path in the matrix.

Spherical particles are generally used as the particle form. Examples of the electroconductive particles include carbon nanotubes or carbon nanofibers having a high aspect ratio. Specific examples are listed as follows: zinc antimonate particles, gallium-doped zinc oxide particles, antimony-doped tin oxide particles, indium-doped tin oxide particles, phosphorus-doped tin oxide particles, aluminum-doped zinc oxide particles, niobium-doped tin oxide particles, fluorine-doped tin oxide particles, gallium-doped tin oxide particles, Ketjen Black, acetylene black, carbon nanotubes, carbon fibers, polypyrrole, or polythiophene. One kind of these electroconductive particles may be used singly or a plurality of kinds thereof may be used in combination.

Solvent:

A solvent is usually added to dissolve the above-mentioned monomer and charge control agent in the coating material for forming a surface layer and to adjust the viscosity to make them easily applied onto the base layer. The solvent is not particularly limited as long as the acrylic monomer and the charge control agent can be dissolved. Preferred is, in particular, a ketone-based solvent such as acetone, 2-butanone, 4-methyl-2-pentanone, or cyclohexanone. Examples include: an aromatic hydrocarbon compound (e.g., benzene, toluene, xylene); an alcohol-based one (e.g., butanol, octanol); an ester compound (e.g., ethyl acetate, butyl acetate, ethyl lactate, γ-butyrolactone, propyleneglycol monomethylether acetate, propyleneglycol monoethylether acetate); or a mixed solvent thereof.

Radical Polymerization Initiator:

The acrylic monomer is polymerized by radical polymerization. Accordingly, it is preferable to add a radical polymerization initiator (hereinafter, referred to as a polymerization initiator) that initiates the polymerization. Examples of the polymerization initiator include: a compound that thermally generates an active radical species (a thermal polymerization initiator); or a compound that generates an active radical species by radiation (light) irradiation (a radiation (photo-) polymerization initiator). More preferred is a method of adding a radiation (photo-) polymerization initiator and performing polymerization by radiation (light) irradiation.

The radiation (photo-) polymerization initiator is not particularly limited as long as the radiation (light) irradiation causes decomposition to generate radicals and initiate polymerization. Examples include the following:

acetophenone, acetophenone benzyl ketal, 1-hydroxycyclohexylphenyl ketone, 2,2-dimethoxy-1,2-diphenylethane-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, benzoinpropyl ether, benzoinethyl ether, benzyldimethyl ketal, 1-(4-isopropylphenyl)-2-hydroxy-2 methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2-benzyl-2-dimethylamino-1-(4-morpholinophenyl)-butanone-1,4-(2-hydroxyethoxy) phenyl-(2-hydroxy-2-propyl)ketone, 2,4,6-trimethylbenzoyldiphenylphosphine oxide, bis-(2,6-dimethoxybenzoyl)-2,4,4-trimethylpentylphosphine oxide, or oligo(2-hydroxy-2-methyl-1-(4-(1-methylvinyl)phenyl) propanone).

The amount of the polymerization initiator blended based on 100 parts by mass of the acrylic monomer is preferably 0.01 parts by mass or more and 10 parts by mass or less and more preferably 0.1 parts by mass or more and 5 parts by mass or less. If the blending amount is less than 0.01 parts by mass, the hardness of a cured product may be insufficient. If the amount is more than 10 parts by mass, the inside (lower layer side) of the cured product is not necessarily cured.

Additional Additive(s):

An additional component(s) may be optionally added to the coating material for forming a surface layer as long as the effects of the present disclosure are not inhibited. Examples of each component that can be blended include a polymerization inhibitor, a polymerization initiation aid, a leveling agent, a wettability improver, a surfactant, a plasticizer, a UV absorber, an antioxidant, an antistatic agent, an inorganic filler, or a pigment.

<Method of Preparing Coating Material for Forming Surface Layer>

The method of preparing a coating material for forming a surface layer is not particularly limited. For example, it is preferable to prepare the coating material as follows. A monomer or oligomer of the resin, a positively chargeable charge control agent, a compatibilizer, a solvent, a polymerization initiator, and an additional component(s) are blended as described below and are put in a container with a stirrer. The mixture is, for instance, stirred at room temperature for 30 min to produce a coating material for forming a surface layer. The temperature and time are set, if appropriate, in optimal ranges.

<Coating Process>

Examples of the process for applying the resulting coating material for forming a surface layer onto a surface of the base layer of the electrophotographic member include regular coating processes such as dip coating, spray coating, flow coating, shower coating, roll coating, and spin coating.

<Curing Protocol>

The applied coating film may be cured by heat or radiation depending on the type of the polymerization initiator contained in the coating material. The radiation is not particularly limited as long as the radiation is active radiation capable of imparting energy that can be used to generate a polymerization initiating species (radical). Examples include a broad range of α-radiation, γ-radiation, X-rays, ultraviolet (UV)-rays, visible light, or electron beams (EB). Among them, ultraviolet rays and electron beams are preferable from the viewpoint of curing sensitivity and how easy the device can be obtained, and ultraviolet rays are particularly preferable.

<<Base Layer>>

As the base layer, an appropriate base layer is selected and used according to usage of the electrophotographic member. When used for an intermediate transfer member, particularly an intermediate transfer belt, the base layer is preferably made of a resin material having both flexibility and mechanical strength.

The resin used for the base layer is not particularly limited. Specific examples thereof include polyimide (PI), polyamideimide (PAI), polypropylene (PP), polyethylene (PE), polyamide (PA), polylactic acid (PLLA), polyethylene terephthalate (PET), polyethylene naphthalate (PEN), polyphenylene sulfide (PPS), polyetheretherketone (PEEK), polycarbonate (PC), or fluororesin (e.g., PVDF).

The base layer may contain, as another optional component(s), an ionic electroconductive agent (e.g., a polymer ionic electroconductive agent, a surfactant), an electroconductive polymer, an antioxidant (e.g., a hindered phenol-based or phosphorus- or sulfur-based one), a UV absorber, an organic pigment, an inorganic pigment, a pH modifier, a crosslinker, a compatibilizer, a mold release agent (e.g., a silicone-based or fluorine-based one), a coupling agent, a lubricant, an insulating filler (e.g., zinc oxide, barium sulfate, calcium sulfate, barium titanate, potassium titanate, strontium titanate, titanium oxide, magnesium oxide, magnesium hydroxide, aluminum hydroxide, talc, mica, clay, kaolin, hydrotalcite, silica, alumina, ferrite, calcium carbonate, barium carbonate, nickel carbonate, glass powder, quartz powder, glass fiber, alumina fiber, potassium titanate fiber, thermosetting resin microparticles), an electroconductive filler (e.g., carbon black, carbon fiber, electroconductive titanium oxide, electroconductive tin oxide, electroconductive mica), and/or an ionic liquid.

<Process for Producing Base Layer>

The process for producing a base layer is not particularly limited, and a molding process fit for each resin can be used. Examples of the process for molding an endless belt-shaped base layer include extrusion molding, inflation molding, blow molding, or centrifugal molding. In the case of forming a surface layer on a surface of the base layer as so formed, the surface layer may be formed by fitting a core onto an inner side of the base layer, then applying a coating liquid for the surface layer as described above, and curing the coating liquid. The thickness of the base layer is preferably from 10 to 500 and more preferably from 30 to 150 μm in order to maintain better flexibility of the intermediate transfer belt. In addition, the thickness of the surface layer is preferably from 0.05 to 20 μm and more preferably from 0.1 to 5 μm from the viewpoint of maintaining better flexibility of the intermediate transfer belt and further improving abrasion resistance of the surface.

Note that another layer may be provided between the base layer and the surface layer. Examples of the other layer include an adhesion layer that improves adhesion between the base layer and the surface layer. Further, the surface of the base layer may be subjected to surface treatment such as corona treatment to improve adhesion to the surface layer.

The application of the electrophotographic member is not particularly limited, and the electrophotographic member is suitably used for, for example, an intermediate transfer member that temporarily transfers and holds a toner image or a conveyance transfer belt that conveys a recording material as a transfer material. In particular, the electrophotographic member can be suitably used as an intermediate transfer belt. In addition, when the electrophotographic member is used as an intermediate transfer belt, the specific surface resistivity of the electrophotographic member is preferably $1\times10^3$ Ω/square or more and $1\times10^{12}$ Ω/square or less. If the specific surface resistivity is $1\times10^3$ Ω/square or more, it is possible to prevent a decrease in resistance, to easily obtain a transfer electric field, and to effectively prevent occurrence of image void and roughness. If the specific surface resistivity is $1\times10^{12}$ Ω/square or less, it is possible to effectively suppress an increase in the transfer voltage and an increase in the size of a power supply and an increase in the cost.

<Electrophotographic Image Forming Apparatus>

Figure 3:
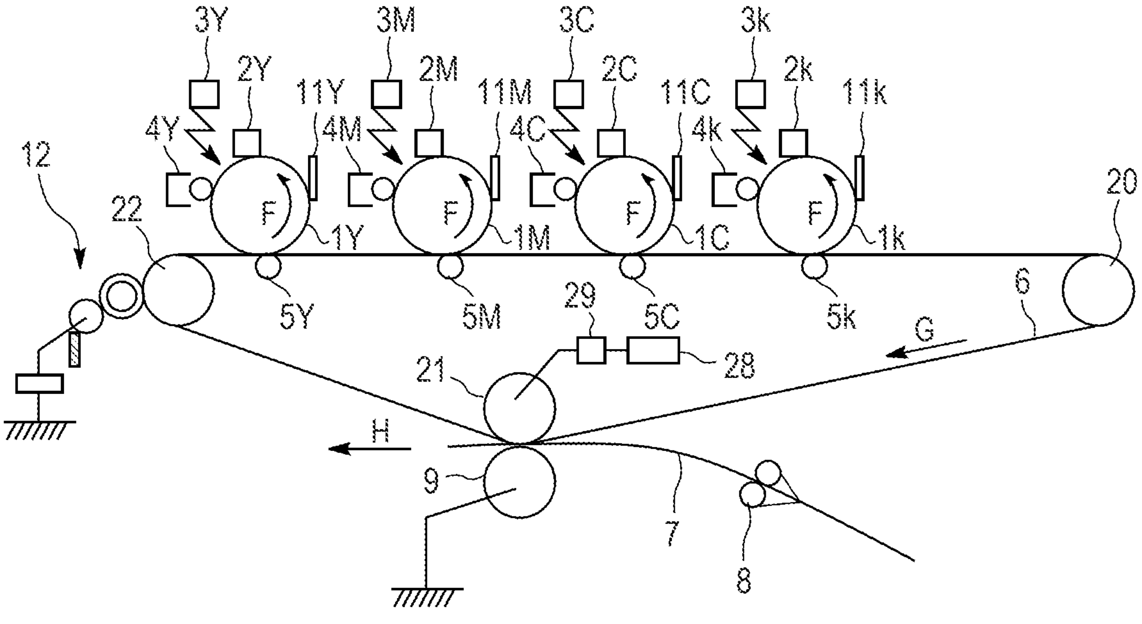
FIG. 3 is a schematic view of an electrophotographic image forming apparatus according to an embodiment of the present disclosure.

The following describes an example of an electrophotographic image forming apparatus using the electrophotographic member according to an embodiment of the present disclosure as an intermediate transfer belt. As illustrated in FIG. 3, this electrophotographic image forming apparatus has what is called a tandem configuration in which electrophotographic stations for multiple colors are arranged side by side in a rotation direction of the intermediate transfer belt. In the following description, suffixes of Y, M, C, and k are attached to reference numerals of components involving each color of yellow, magenta, cyan, or black, respectively. However, the suffixes may be omitted for similar components.

In FIG. 3, charging devices 2Y, 2M, 2C, and 2*k*, exposing devices 3Y, 3M, 3C, and 3*k*, developing devices 4Y, 4M, 4C, and 4*k*, and an intermediate transfer belt (intermediate transfer member) 6 are disposed around the photosensitive drums (electrophotographic photosensitive members; image carriers) 1Y, 1M, 1C, and 1*k*, respectively. Each photosensitive drum 1 is rotated at a given peripheral speed (process speed) in the direction of each arrow F. Each charging device 2 charges the peripheral surface of the photosensitive drum 1 to a predetermined polarity and a predetermined potential (primary charging). A laser beam scanner as each exposing device 3 outputs a laser beam that is on/off modulated in response to image information input from an external device such as an image scanner or a computer (not illustrated), and scans and exposes the charged surface on the photosensitive drum 1. By this scanning exposure, an electrostatic latent image corresponding to target image information is formed on a surface of the photosensitive drum 1.

The developing devices 4Y, 4M, 4C, and 4*k* contain toners of respective color components of yellow (Y), magenta (M), cyan (C), and black (k), respectively. Then, the developing device 4 to be used is selected based on the image information, the developer (toner) is developed on the surface of the photosensitive drum 1, and the electrostatic latent image is visualized as a toner image. In this embodiment, a reversal development method is used in which toner is attached to an exposed portion of the electrostatic latent image in this manner and is developed. In addition, an electrophotographic image forming unit is structured by such charging devices, exposing devices, and developing devices.

Further, the intermediate transfer belt 6 is an endless belt, is disposed in contact with a surface of the photosensitive drum 1, and is stretched around a plurality of stretching rollers 20, 21, and 22. Then, the intermediate transfer belt 6 rotationally moves in the direction of the arrow G. In this embodiment, the stretching roller 20 is a tension roller configured to control the tension of the intermediate transfer belt 6 to be constant, the stretching roller 22 is a driving roller of the intermediate transfer belt 6, and the stretching roller 21 is a counter roller for secondary transfer. Primary transfer rollers 5Y, 5M, 5C, and 5*k* are disposed at primary transfer positions facing the photosensitive drums 1 with the intermediate transfer belt 6 interposed therebetween.

Unfixed toner images of the respective colors as formed on the photosensitive drums 1 are sequentially subjected to electrostatic primary transfer onto the intermediate transfer belt 6 by applying a primary transfer bias having a polarity opposite to the charging polarity of the toner to each primary transfer roller 5 by using a constant voltage source or a constant current source (not illustrated). Then, a full-color image is obtained in which the four color unfixed toner images are superimposed on the intermediate transfer belt 6. The intermediate transfer belt 6 rotates while carrying the toner image transferred from each photosensitive drum 1 in this manner. Transfer toner residues on the surface of each photosensitive drum 1 are cleaned by each cleaning device 11 at every rotation of each photosensitive drum 1 after the primary transfer. Then, the image forming process is repeated.

In addition, at a secondary transfer position of the intermediate transfer belt 6 facing the conveyance path of the recording material 7 as a recording medium, a secondary transfer roller (secondary transfer unit) 9 is disposed in pressure contact with the side of toner image-carrying surface of the intermediate transfer belt 6. Further, the counter roller 21 that is formed as a counter electrode of the secondary transfer roller 9 and has a bias applied is disposed on the back surface side of the intermediate transfer belt 6 at the secondary transfer position. When the toner image on the intermediate transfer belt 6 is transferred to the recording material 7, a bias of, for example, −1000 to −3000 V having the same polarity as the toner is applied to the counter roller 21 by a transfer bias applying unit 28. Then, a current of −10 to −50 μA flows. The transfer voltage at this time is detected by a transfer voltage detection unit 29. Furthermore, a cleaning device (belt cleaner) 12 configured to remove toner remaining on the intermediate transfer belt 6 after the secondary transfer is provided on the downstream side of the secondary transfer position.

The recording material 7 passes through a conveyance guide 8, is conveyed in the direction of the arrow H, and is introduced into the secondary transfer position. The recording material 7 introduced into the secondary transfer position is nipped and conveyed at the secondary transfer position. At that time, a constant voltage bias (transfer bias) controlled to a predetermined value is applied from the secondary transfer bias applying unit 28 to the counter roller 21 of the secondary transfer roller 9. Here, a transfer bias having the same polarity as that of the toner is applied to the counter roller 21. Then, full four color images (toner images) superimposed on the intermediate transfer belt 6 at the transfer site is collectively transferred to the recording material 7. In this way, a full-color unfixed toner image is formed on the recording medium. The recording material 7 having the toner image transferred is introduced into a fixing device (not illustrated) and heat-fixed.

An embodiment of the present disclosure makes it possible to obtain an electrophotographic member that includes a surface with excellent abrasion resistance and allows toner to have an increased charge amount, thereby eliciting uniform and high transfer efficiency.

EXAMPLES

Hereinafter, the present disclosure will be specifically described with reference to Examples and Comparative Examples. However, the present disclosure is not limited only to the configurations embodied in the Examples.

<<To Manufacture Intermediate Transfer Belt>>

<To Produce Base Layer>

A base layer was produced by blow molding as follows.

First, a biaxial extruder (trade name: TEX30α, manufactured by The Japan Steel Works, Ltd.) was used to prepare a thermoplastic resin composition by heating and melt-kneading the following resin materials:

100 parts by mass of PET: polyethylene terephthalate (trade name: TR-8550, manufactured by Teijin Chemicals Ltd.);

20 parts by mass of PEEA: polyether ester amide (trade name: PELESTAT NC6321, manufactured by Sanyo Chemical Industries, Ltd.);

2 parts by mass of lithium perchlorate (trade name: lithium perchlorate, manufactured by Nippon Carlit Co., Ltd.); and 1 part by mass of carbon (trade name: MA-100, manufactured by Mitsubishi Chemical Corporation). The kneading temperature was adjusted to be in the range of 260° C. or higher and 280° C. or lower, and the kneading time was set to about 3 to 5 min. The resulting thermoplastic resin composition was pelletized and dried at a temperature of 140° C. for 6 h. Next, the dried pellet-shaped thermoplastic resin composition was charged into an injection molding machine (trade name: SE180D, manufactured by Sumitomo Heavy Industries, Ltd.). Then, the cylinder preset temperature was set to 295° C., and injection molding was performed in a mold, the temperature of which was controlled to 30° C., to prepare a preform. The resulting preform had a test tube shape with an outer diameter of 20 mm, an inner diameter of 18 mm, and a length of 150 mm.

Figure 2:
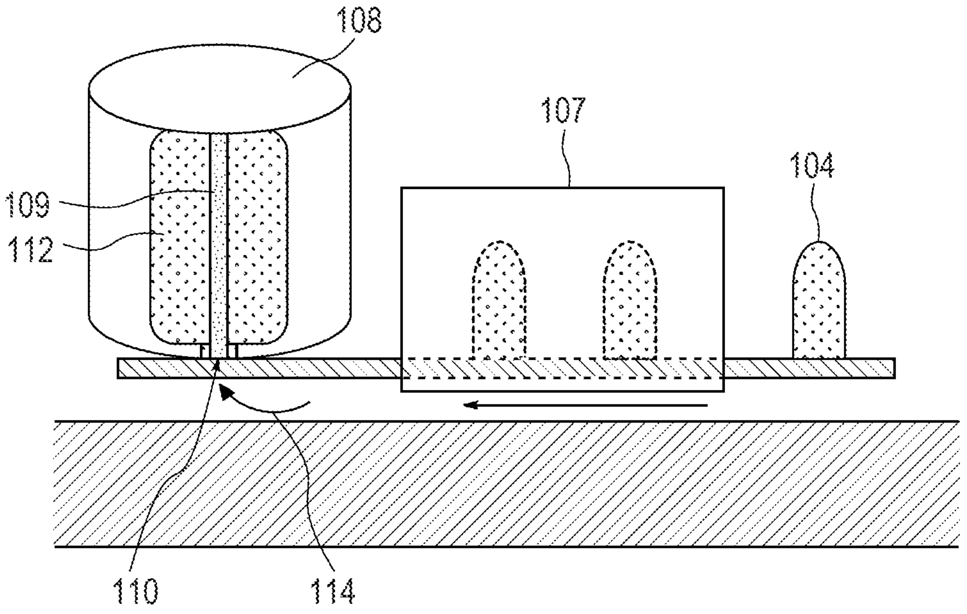
FIG. 2 is a schematic view of a stretch blow molding machine that can be used for manufacturing an electrophotographic member according to an embodiment of the present disclosure.

Next, the preform was biaxially stretched using a biaxial stretcher (stretch blow molding machine) illustrated in FIG. 2. Before biaxial stretching, the preform 104 was placed in a heating device 107 provided with a non-contact heater (not illustrated) for heating the outer wall and the inner wall of the preform 104, and the preform was heated with the heater so that the outer surface temperature of the preform was 120° C.

Then, the heated preform 104 was placed in a blow mold 108, the mold temperature of which was maintained at 30° C., and stretched in each axial direction using a stretching rod 109. At the same time, the air 114, the temperature of which was controlled to 23° C., was introduced into the preform from a blow air inlet 110, and the preform 104 was stretched in the radial direction. In this way, a bottle-shaped molded product 112 was obtained.

Subsequently, the body portion of the resulting bottle-shaped molded product 112 was cut to obtain a base layer of a seamless electroconductive belt. The thickness of the base layer of this electroconductive belt was 70 μm. The surface resistivity of the base layer was $1.0\times10^{11}$ Ω/square.

<To Form Surface Layer>

The process for producing a surface layer is as described in the section "Coating Process" and is not particularly limited. In the following Examples and Comparative Examples, dip coating was used.

The above base layer obtained by blow molding was fitted onto the outer periphery of a cylindrical mold (core), the ends were sealed, and the mold was immersed together with the base layer in a container filled with a coating liquid for the surface layer as described below. A coating film made of the coating liquid was formed on the surface of the base layer by pulling upward such that the relative speed between the liquid level of the coating liquid and the base layer was constant.

For instance, the pulling speed (relative speed between the liquid level of the coating liquid and the base layer) and the solvent ratio of the coating liquid were adjusted according to the required film thickness.

In the following Examples and Comparative Examples, the pulling speed was set to 10 to 50 mm/s, and the film thickness of the surface layer was adjusted to about 3 μm. The coating liquid (acrylic resin composition) was blended to have each composition designated in Table 1. After formed, the coating film was dried for 1 min under an environment of 23° C. while exhausted. The drying temperature and the drying time were adjusted, if appropriate, depending on, for instance, the solvent type, the solvent ratio, and the film thickness. Thereafter, the coating film was irradiated with UV light using a UV irradiator (trade name: UE06/81-3, manufactured by EYE GRAPHICS Co., Ltd.) until the integrated light amount reached 600 $mJ/cm^2$ to cure the coating film. The thickness of the resulting surface layer was 3 μm when a cross-section was observed under an electron microscope.

<<Evaluation Procedure>>

<Charge Amount of Negatively Chargeable Toner>

First, 0.5 g of toner was placed on a surface of each intermediate transfer belt, and the intermediate transfer belt was covered with a cleaning paper. Further, a 500-g iron weight having a cross section of 50 mm square was placed on the cleaning paper and was made to slide and reciprocate 200 mm 20 times. In this way, the toner was brought into contact with the intermediate transfer belt and charged. The negatively chargeable toner used was magenta toner of HP LaserJet Pro 400 color Printer M451dw (manufactured by HP, Inc.).

Next, the charge amount of the triboelectric charged toner was measured by Model 212 HS Q/m METER (manufactured by TREK, Inc.). The mass was then weighed with an electronic balance, and the charge amount per unit mass Q/M (μC/g) was calculated.

<Convex Defect>

The position of each convex portion (convex defect) on the surface of the resulting intermediate transfer belt was visually identified. Next, the shape was measured with a confocal microscope OPTELICS C130 (trade name; manufactured by Lasertec Corporation). Then, the number of convex portions (convex defects) having a height of more than 15 μm was counted per intermediate transfer belt. Note that the confocal microscope had a 10× objective lens, and the difference in height between the peak top of the shape profile and the flat portion was defined as the height of the convex defect. In addition, there were convex defects (e.g., convex defects at the base layer) caused by other than the charge control agent in the surface layer. These convex defects were, if appropriate, inspected, analyzed, and then assessed, and were thus excluded from the number of interest in this evaluation.

<Image Evaluation>

The intermediate transfer belt was incorporated into HP COLOR LASERJET CP 3525dn (trade name; manufactured by HP, Inc.). Then, a solid black image was output to check whether or not a white spot caused by the convex defect was observed and image uniformity. In this image evaluation, as a recording media (paper), "Vitality" (trade name; manufactured by Xerox Corporation) was employed.

Examples 1 to 7 and Comparative Examples 1 to 6

Table 1 shows the blending ratio of materials included as components of each coating liquid for a surface layer so as to form the surface layer used in each of Examples, Comparative Examples, or Reference Examples. The above process using the materials and the blending ratio designated in Table 1 was implemented to produce the surface layer on the base layer and then manufacture an intermediate transfer belt.

TABLE 1

| | Acrylic resin | | | Charge control agent | | Compatibilizer | | | Photopolymerization | Electroconductive | Leveling |
|---|---|---|---|---|---|---|---|---|---|---|---|
| | No. 1 | No. 2 | No. 3 | No. 1 | No. 2 | No. 1 | No. 2 | Solvent | initiator | agent | agent |
| Example 1 | 100 | | | 14 | | 6 | | 250 | 5 | 20 | 0.2 |
| Example 2 | 100 | | | 20 | | 8.6 | | 250 | 5 | 20 | 0.2 |
| Example 3 | 100 | | | 5 | | 2.1 | | 250 | 5 | 20 | 0.2 |
| Example 4 | 100 | | | 30 | | 12.9 | | 250 | 5 | 20 | 0.2 |
| Example 5 | 100 | | | 0.5 | | 0.2 | | 250 | 5 | 20 | 0.2 |
| Example 6 | 100 | | | 14 | | 3 | | 250 | 5 | 20 | 0.2 |
| Example 7 | 100 | | | 14 | | 9 | | 250 | 5 | 20 | 0.2 |
| Example 8 | | 100 | | 14 | | 6 | | 250 | 5 | 20 | 0.2 |
| Example 9 | | | 100 | 14 | | 6 | | 250 | 5 | 20 | 0.2 |
| Comparative Example 1 | 100 | | | 14 | | | | 250 | 5 | 20 | 0.2 |
| Comparative Example 2 | 100 | | | 14 | | | 6 | 250 | 5 | 20 | 0.2 |
| Comparative Example 3 | 100 | | | | 14 | | | 250 | 5 | 20 | 0.2 |
| Comparative Example 4 | 100 | | | | 14 | 6 | | 250 | 5 | 20 | 0.2 |
| Comparative Example 5 | 100 | | | | 14 | | 6 | 250 | 5 | 20 | 0.2 |
| Comparative Example 6 | 100 | | | | | | | 250 | 5 | 20 | 0.2 |

In the table, the numbers are represented in parts by mass.

Note that the following materials were used as the materials designated in Table 1.

Acrylic resin

No. 1: Aronix M-305 (trade name; manufactured by TOAGOSEI CO., LTD.)

No. 2: KAYARAD DPHA (trade name; manufactured by Nippon Kayaku Co., Ltd.)

No. 3: Aronix M-313 (Trade name; manufactured by TOAGOSEI CO., LTD.)

Charge control agent

No. 1: Nigrosine (Solvent Black 7) (trade name; manufactured by Orient Chemical Industries Co., Ltd.)

No. 2: TP-415 (trade name; manufactured by Hodogaya Chemical Co., Ltd.)

Compatibilizer

No. 1: Sodium alkylbenzene sulfonate (* having a structure represented by formula (1) where J + k = 10 to 13; manufactured by FUJIFILM Wako Pure Chemical Corporation)

No. 2: Rosin-modified resin (manufactured by Arakawa Chemical Industries, Ltd.)

Solvent: Special grade 2-butanone (manufactured by Kishida Chemical Co., Ltd.)

Photopolymerization initiator: Omnirad 907 (trade name; manufactured by IGM RESINS, Inc.)

Electroconductive agent: CX-410K (trade name; manufactured by Nissan Chemical Corporation)

Leveling agent: BYK-UV3500 (trade name; manufactured by BYK, Inc.)

Each manufactured intermediate transfer belt of Examples or Comparative Examples was evaluated by the above-described procedure. Table 2 shows the evaluation results of Examples and Comparative Examples.

TABLE 2

| | Charge amount (μC/g) | Number of convex defects (counts) | Image grade ranking |
|---|---|---|---|
| Example 1 | −67 | 0 | A |
| Example 2 | −67 | 0 | A |
| Example 3 | −60 | 0 | A |
| Example 4 | −66 | 0 | A |
| Example 5 | −50 | 0 | A |
| Example 6 | −66 | 0 | A |
| Example 7 | −66 | 0 | A |
| Example 8 | −65 | 0 | A |
| Example 9 | −67 | 0 | A |
| Comparative Example 1 | −66 | 32 | C |
| Comparative Example 2 | −67 | 29 | C |
| Comparative Example 3 | −63 | 53 | C |
| Comparative Example 4 | −64 | 33 | C |
| Comparative Example 5 | −64 | 35 | C |
| Comparative Example 6 | −36 | 0 | B |

Note
that the solid black images obtained in Examples 1 to 9 and Comparative Examples 1 to 6 were evaluated in accordance with the following evaluation standard.
[Evaluation Standard]
Rank A: no white spots were observed and no density unevenness was observed in the solid black image.
Rank B; no white spots were observed but density unevenness was observed in the solid black image.
Rank C: white spots were observed in the solid black image.

The intermediate transfer belts obtained in Examples 1 to 9 each of which has a surface layer containing the charge control agent No. 1 (nigrosine) and sodium alkylbenzene-sulfonate as a compatibilizer provided large amount of negative charge to negatively chargeable toner was large. Further, no convex defects having a height of more than 15 μm resulting from the charge control agent were observed on the surface of the respective surface layers. Thus, the state of each image was favorable.

In the intermediate transfer belt according to each of Comparative Example 1 to 5, convex defects having a height of more than 15 μm resulting from the charge control agent were observed. In the solid black image obtained by using the intermediate transfer belts according to Comparative Examples 1-5, white spots were observed. In particular, as shown in Comparative Examples 2, 4, and 5, when the charge control agent and the compatibilizer were not in an appropriate combination, the charge control agent was not well miscible. Thus, occurrence of convex defects having a height of more than 15 μm was not prevented, and the grade of the image was found to be poor. The intermediate transfer belt according to Comparative Example 6 was free from the convex defects, but it was not able to provide sufficient amount of negative charge to a negatively chargeable toner in comparison with the intermediate transfer belts of Examples 1 to 9. As a result of that, the toner transfer performance was insufficient and density unevenness was occurred in the solid black image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-169229, filed Oct. 6, 2020, which is hereby incorporated by reference herein in its entirety.

What is claimed is:

1. An intermediate transfer belt, comprising:

a base layer; and a surface layer on the base layer, said surface layer comprising a positively chargeable charge control agent, and at least one of an acrylic resin and a methacrylic resin, wherein a surface of the surface layer is free from a convex portion having a height greater than 15 μm resulting from the charge control agent.

2. The intermediate transfer belt according to claim 1, wherein the surface layer further comprises a compatibilizer that enhances the compatibility of the charge control agent with a monomer of the resin.

3. The intermediate transfer belt according to claim 2, wherein the charge control agent is nigrosine and the compatibilizer is alkylbenzenesulfonic acid or a salt thereof.

4. The intermediate transfer belt according to claim 3, wherein the compatibilizer has a structure represented by formula (1)

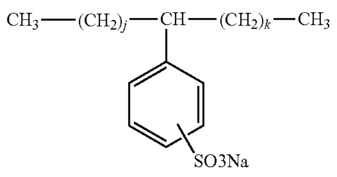

(1)

where j and k independently represent an integer of 1 or more and $7 \leq j+k \leq 11$.

5. The intermediate transfer belt according to claim 1, wherein the intermediate transfer belt has an endless belt shape.

6. An electrophotographic image forming apparatus, comprising:

an intermediate transfer belt, the intermediate transfer belt comprising (i) a base layer and (ii) a surface layer on the base layer, said surface layer comprising a positively chargeable charge control agent, and at least one of an acrylic resin and a methacrylic resin, wherein a surface of the surface layer is free from a convex portion having a height greater than 15 μm resulting from the charge control agent.

7. The electrophotographic image forming apparatus according to claim 6, further comprising:

an electrophotographic photosensitive member; and a secondary transfer unit, wherein an unfixed toner image formed on the electrophotographic photosensitive member is subjected to primary transfer onto the intermediate transfer belt, and the secondary transfer unit is configured to subject the toner image transferred onto the intermediate transfer belt onto a recording medium.

* * * * *